(12) United States Patent
Poddar et al.

(10) Patent No.: US 12,488,731 B2
(45) Date of Patent: Dec. 2, 2025

(54) DISPLAY TIMING CONTROLLER AND METHOD

(71) Applicant: Intel Corporation, Santa Clara, CA (US)

(72) Inventors: Joy Poddar, Bangalore (IN); Dong-Ho Han, Beaverton, OR (US); Pujitha Davuluri, Portland, OR (US); Qing De Xia, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/522,310

(22) Filed: Nov. 29, 2023

(65) Prior Publication Data

US 2025/0104599 A1 Mar. 27, 2025

(30) Foreign Application Priority Data

Sep. 27, 2023 (WO) ................ PCT/CN2023/122313

(51) Int. Cl.
*G09G 3/20* (2006.01)

(52) U.S. Cl.
CPC ....... *G09G 3/2096* (2013.01); *G09G 2310/08* (2013.01); *G09G 2370/16* (2013.01)

(58) Field of Classification Search
CPC .. G09G 2330/06; G09G 3/20; G09G 2370/08; G09G 2330/12; G09G 2310/08; G09G 5/008; G09G 3/2096; G09G 2370/16; H04B 1/123

See application file for complete search history.

(56) References Cited

U.S. PATENT DOCUMENTS

| | | | |
|---|---|---|---|
| 7,761,057 B2 | 7/2010 | Sreerama et al. | |
| 8,611,478 B2* | 12/2013 | Sreerama | H03D 1/04 375/346 |
| 11,558,158 B2 | 1/2023 | Shusterman et al. | |
| 2009/0080498 A1* | 3/2009 | Deisher | H04B 15/04 375/136 |
| 2010/0141613 A1* | 6/2010 | Sonobe | G09G 5/18 345/204 |
| 2016/0344456 A1* | 11/2016 | Prendergast | H04B 7/0413 |
| 2023/0047526 A1* | 2/2023 | Li | H04L 5/0053 |
| 2023/0152393 A1* | 5/2023 | Haas | G01R 33/091 702/57 |

\* cited by examiner

*Primary Examiner* — Sujit Shah
(74) *Attorney, Agent, or Firm* — Viering, Jentschura & Partner mbB (57) ABSTRACT

A device includes a processor that is configured to determine a band used for wireless communication by a baseband modem; select an operational frequency for a display controller based on the determined band; and control the display controller to operate at the selected operational frequency.

17 Claims, 6 Drawing Sheets

| Band | F-start | F-stop | BW | Median |
|---|---|---|---|---|
| 1 | 2110 | 2170 | 60 | 2140 |
| 2 | 1930 | 1990 | 60 | 1960 |
| 3 | 1805 | 1880 | 75 | 1842.5 |
| 4 | 2110 | 2355 | 45 | 2132.5 |
| 5 | 869 | 894 | 25 | 881.5 |
| 6 | 875 | 885 | 10 | 880 |
| 7 | 2630 | 2690 | 70 | 265.5 |
| 8 | 925 | 960 | 35 | 942.5 |
| 12 | 729 | 745 | 17 | 737.5 |
| 13 | 745 | 755 | 10 | 751 |
| 14 | 758 | 768 | 10 | 763 |
| 17 | 734 | 745 | 12 | 740 |
| 18 | 860 | 875 | 15 | 867.5 |
| 19 | 875 | 890 | 15 | 882.5 |
| 20 | 791 | 821 | 30 | 806 |
| 25 | 1930 | 1995 | 65 | 1962.5 |
| 26 | 859 | 894 | 35 | 876.5 |
| 28 | 758 | 803 | 45 | 780.5 |
| 29 | 717 | 728 | 11 | 722.5 |
| 32 | 1452 | 1495 | 44 | 147.4 |
| 34 | 2010 | 2025 | 15 | 2017.5 |
| 38 | 2570 | 2620 | 50 | 2595 |
| 39 | 1880 | 1920 | 40 | 1900 |
| 40 | 2300 | 2400 | 100 | 2350 |
| 41 | 2496 | 2690 | 194 | 2593 |
| 42 | 3400 | 3600 | 200 | 3500 |
| 43 | 3600 | 3800 | 200 | 3700 |
| 48 | 3550 | 3700 | 150 | 3625 |
| n71 | 617 | 652 | 35 | 634.5 |
| n77 | 3300 | 4200 | 900 | 3750 |
| n78 | 3100 | 3400 | 500 | 3250 |
| n79 | 4400 | 5000 | 600 | 4700 |

DISPLAY TIMING CONTROLLER AND METHOD

CROSS-REFERENCE TO RELATED APPLICATIONS

This application claims priority to International Application PCT/CN2023/122313, filed on Sep. 27, 2023, the entire contents of which are incorporated herein by reference.

TECHNICAL FIELD

Various aspects of this disclosure generally relate to the management of a display-timing controller to reduce interference with wireless transmission and/or wireless reception.

BACKGROUND

Certain devices having both a display and a wireless transceiver may suffer from reduced performance or impaired efficiency resulting from interference from the display with the wireless communication. This may be especially detrimental to the performance of certain wireless wide area network (WWAN) communications, such as, but not limited to, in the context of certain 4th Generation Broadband Cellular Network Technology (4G) signals, certain 5th Generation Broadband Cellular Network Technology (5G) signals, or certain signals pursuant to the Institute of Electrical and Electronics Engineers standard 802.11 (e.g. Wi-Fi signals or Wireless Local Area Network (WLAN) signals). That is, emissions from the display's timing controller (T-Con) display panel interface may impair cellular or Wi-Fi performance. In fact, the input/output (I/O) interfaces between the T-Con and the display panel may be one of major noise aggressors for integrated cellular (e.g., WWAN) or Wi-Fi radios. In a common example, cellular or Wi-Fi performances (ranges, connections, throughputs) in laptops may be significantly degraded by the noise. Owing to the frequency range, this problem may become particularly acute for 5G ultra-low band transmissions, such as using B71.

BRIEF DESCRIPTION OF THE DRAWINGS

In the drawings, like reference characters generally refer to the same parts throughout the different views. The drawings are not necessarily to scale, emphasis instead generally being placed upon illustrating the exemplary principles of the disclosure. In the following description, various exemplary embodiments of the disclosure are described with reference to the following drawings, in which.

DETAILED DESCRIPTION

The following detailed description refers to the accompanying drawings that show, by way of illustration, exemplary details and embodiments in which aspects of the present disclosure may be practiced.

The word "exemplary" is used herein to mean "serving as an example, instance, or illustration". Any embodiment or design described herein as "exemplary" is not necessarily to be construed as preferred or advantageous over other embodiments or designs.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc.).

The phrases "group (of)", "set (of)", "collection (of)", "series (of)", "sequence (of)", "grouping (of)", etc., in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

By way of background, a display (e.g. an LCD display) may have a timing controller (T-Con), which may be configured to receive data to be displayed from a processor and to control one or more driver chips to in turn control the color filters to display an image corresponding to the data. The T-Con may send its signals using the embedded display port (eDP) interface. The T-Con may be configured to alter any of brightness, color, or refresh rate. Key to the T-Con's operations is a T-Con clock, which plays a role in the speed at which the T-Con sends instructions/data to the driver chips. As described above, the T-Con clock may operate in a frequency range that interferes with certain wireless communications. Thus, where a communication module (e.g. a modem, a transceiver, an antenna, etc.) is in close proximity to the T-Con (such as, for example, in the context of a laptop or tablet computer), the wireless performance of the communication module may be impaired.

Various efforts are known to attempt to compensate for this interference. For example, one or more radiofrequency absorbing materials may be installed to absorb some or all of the electromagnetic radiation from the T-Con. In some instances, such radiofrequency absorbing materials may cover entire panel boards. This approach is expensive, is limited at least by available space, and cannot be used in all platforms. Moreover, such absorbent material degrades over time and therefore may provide unsatisfactory results in the long term. In addition, and even despite with the use of said absorbent materials, some platforms/devices will still have the radio performance issues due to remaining interference.

A second known strategy to compensate for the T-Con's interference is the use of a spread spectrum clock. In this strategy, a signal corresponding to the system clock is intentionally spread in the frequency domain. The resulting wider bandwidth makes the signal more robust to interference. Nevertheless, this affects neighboring frequency bands and thus may be associated with other complications or undesired effects.

Figure 1:
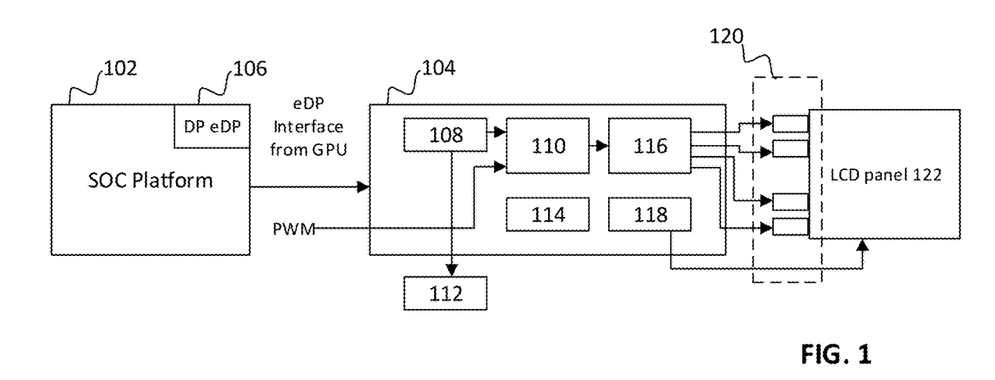
FIG. 1 depicts a conventional timing controller.

FIG. 1 depicts a conventional T-Con 104, which may be used to control a display (e.g., an LCD panel). The T-Con 104 may be connected to one or more processors (in this case labeled as the SOC or system-on-chip), such as through the eDP (Enhanced Display Port) interface 106. Using the eDP (or alternatively, using another interface), the T-Con 104 can receive information from, and send information to, the SOC platform. Using the device and methods disclosed herein, the T-Con clock frequency may be selected based on the active radiofrequency band in use, such that the selected T-Con clock frequency is a frequency that does not interfere with the active radiofrequency band.

Returning to FIG. 1, the SOC (e.g. the SOC platform) 102 may send the radio band (or a peer-to-peer (P2P) clock frequency) to the T-Con 104. This may be sent, for example, via an auxiliary channel of the eDP interface 106, such as whenever the radio channel change occurs. This may be received, for example via the eDP receiver 108 of the T-Con 104. The T-Con may further include a pixel formatter and timing controller 110. The eDP receiver 108 may output to the pixel formatter and timing controller 110 and optionally to the extended display identification data (EDID), which, for example, may be stored in a firmware chip such as an electrically erasable programmable read-only memory (EPROM) 112. The T-Con may further optionally include a microprocessor (MPU) and control circuit 114, an LCD interface 116, and a backlight control circuit 118 (e.g. a Smart-Backlight™ Control). The LCD interface circuit 116 may output to one or more source drivers 120, which may drive an LCD panel 122.

The T-Con 104 may dynamically change the P2P clock frequency based on the real-time updated information from the SOC platform. The T-Con 104 may send an acknowledgement to SOC(s). The T-Con 104 may then send the data to the display panel 122 using the new clock setting (e.g. the new P2P clock setting).

Figure 2:
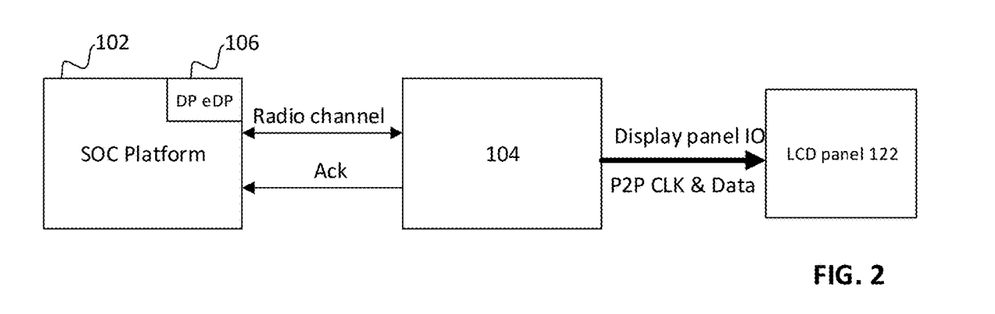
FIG. 2 depicts steps to compute the effective Peer-to-Peer (P2P) clock.

A series of steps to compute the effective P2P clock is depicted in FIG. 2. These steps may be implemented in hardware or software, or a combination thereof. The SOC (e.g. the SOC platform) may 102 transmit radio channel information (e.g. such as any of the frequency, the band, etc.) to the T-Con 104, which may acknowledge the transmission. Using procedures described below, the T-Con 104 may determine an appropriate clock frequency. Ideally, the appropriate clock frequency is a frequency that provides no or minimal interference with the nearby wireless communication module. For example, the clock frequency may be a frequency that falls between (but does not overlap with) two harmonics of the fundamental frequency for transmission. Once the appropriate clock frequency is determined, the T-Con 104 may send to the display panel (e.g. through the display panel I/O) the determined clock frequency, such that the display panel will then be operated with the determined clock frequency, thereby reducing or eliminating altogether interference to wideband communication from the display.

This process offers several advantages over previously implemented solutions, such as the use of radiofrequency absorption materials. First, adaptation of the display's frequency is less expensive than the use of radiofrequency absorbers, which may cost $1.50 to $3.00 per device. In fact, since the procedure as described herein may be implemented in software using existing components, it may be implemented with no, or virtually no, additional related cost. Second, this solution is more universally implementable, as it can be used on virtually all platforms and with virtually all displays. Finally, unlike with the use of radiofrequency absorbers, this solution will not deteriorate over time.

Figure 3:
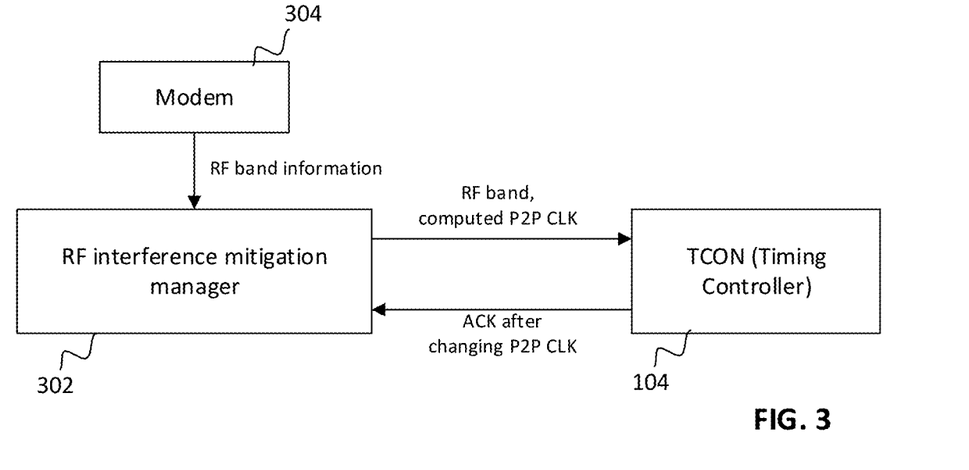
FIG. 3 depicts the use of an RF interference management policy manager to determine the new clock frequency.

FIG. 3 depicts the use of an RF interference management policy manager 302 to determine the new clock frequency for the T-Con 104 based on the RF band information from the mode. Although the RF interference management policy manager 302 is depicted herein as a structural block, the RF interference management policy manager 302 may be implemented in hardware or software, or any combination thereof. In some implementations, the RF interference management policy manager 302 may be implemented completely in software, such that the RF interference management policy manager 302 represents instructions or computer code that, if executed by a processor, control the processor to perform the procedure described herein.

Moreover, using procedure disclosed herein, it is possible to dynamically control the T-Con 104 clock depending on the RF active band. In this procedure, the RF Interference Mitigation Manager 302 may receive RF profile information, such as from the modem. This RF profile information may include center frequency, bandwidth etc., whenever there is a change in RF channel from the modem 304 (e.g. from a 4G or 5G modem).

The RF Interference Mitigation Manager may further receive T-Con-specific information from the T-Con module, such as a minimum frequency (e.g. a minimum possible frequency of the T-Con clock), a maximum frequency (e.g. a maximum possible frequency of the T-Con clock), and/or a current frequency of the P2P clock. The RF Interference Mitigation Manager 302 may then determine an effective P2P clock frequency to mitigate the interference on the wireless signals and sends this determined frequency to the T-Con 104 (the steps/formula for this determination are described below). The T-Con 104 may change the P2P clock and may acknowledge this to the RF Interference Mitigation Manager 302.

Current systems already include an interface between the 4G/5G modem with the RF Interference Management Manager. That is, the processing unit or units that otherwise control or output to the screen drivers, already include an interface to the modem, and therefore the solution disclosed herein takes advantage of this pre-existing interface to simplify communication.

Turning to the specific calculations for determining the new T-Con clock frequency, these calculations may generally be understood as having two aspects or parts: first, the band information is extracted from the RF channel; second, the new P2P clock is computed.

Figure 4A:
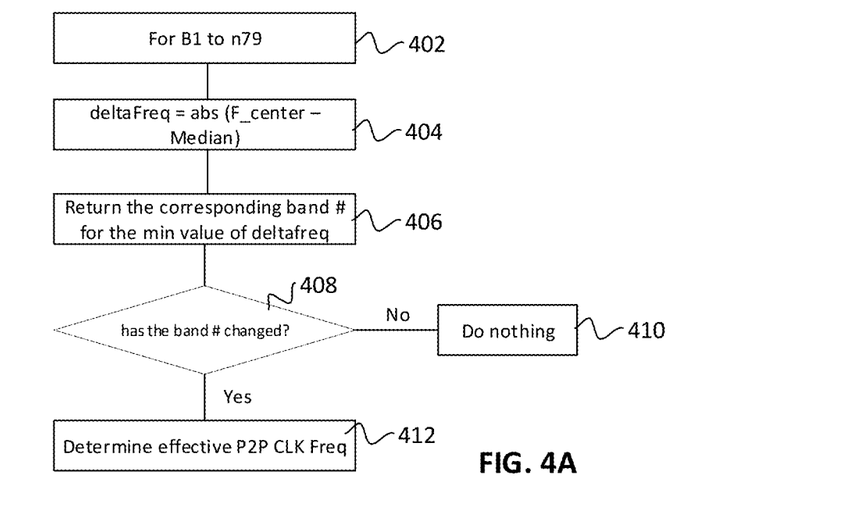
FIG. 4A depicts the first step for the process of determining the new T-Con clock frequency.
Figure 4B:
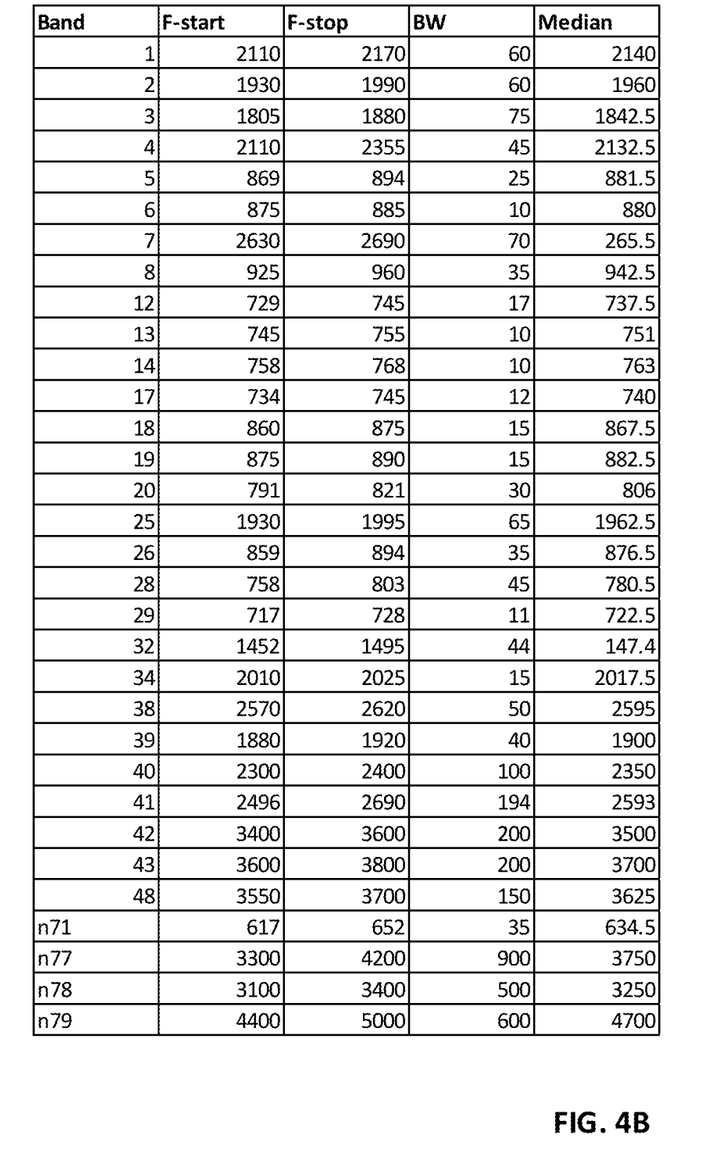
FIG. 4B depicts a sample look up table for the procedure of FIG. 4A.

FIG. 4A depicts the first aspect or part, which is the calculation or determination of the current frequency band. In this figure, and for the available frequencies (depicted exemplarily as "for B1 to n79" 402), the current frequency is determined. This is done by determining the frequency delta (also referred to as the delta frequency or the deltaFreq) as the absolute value of the frequency center minus the median 404. From this, the corresponding band may be determined, such as by using the lookup table of FIG. 4B or a similar table. By way of example, the RF Interference Mitigation Manager may determine that the modem is sending transmissions from approximately 758 MHz to approximately 803 MHz, with a center frequency of 780.5 MHz. Using the lookup table, the RF Interference Mitigation Manager may determine that the corresponding band is band 28, since the center frequency is closest to the median frequency in the lookup table. The corresponding band # for the minimum value of the delta frequency is then returned (e.g. sent to or determined at the RF Interference Mitigation Manager). Regarding the first step to extract band information from the RF channel, a static band information table (e.g. a look up table), for example as depicted in FIG. 4B, may be maintained in the RF Interference Mitigation Manager.

The RF Interference Mitigation Manager may then determine whether the frequency band has changed 408 (e.g. whether a recent change has occurred, or whether the band has changed compared to the previous assessment of the band at the first step). If the frequency band has not changed, then no action is necessary 410. If, however, the frequency band has changed, then the RF Interference Mitigation Manager may determine the effective P2P CLK frequency 412. The assumption here is that, using the process disclosed herein, the P2P CLK frequency would have already been optimized for the previous band, and therefore any change from the previous band to a new band would necessitate a new P2P CLK optimization. That is, whenever there is a change in the radio channel or band, the RF Interference Mitigation Manager may use the below process described herein to compute the current RF band from the RF channel information and thus determine that the change in the band has occurred.

In the second step, the effective P2P clock frequency may be determined. Whenever there is a change in radio channel (e.g., as determined using the process, above, to determine a change in the band), the following may be performed:

First, the RF Interference Mitigation Manager may calculate the new RFI "Effective P2P clock frequency". Second, the new T-Con clock frequency (TCON_P2P_CLK_Freq) is calculated as TCON_P2P_CLK_Freq=Effective P2P CLK frequency*Multiplication Factor, wherein the multiplication factor is a training pattern. The TCON_P2P_CLK_Freq value may be written to the T-CON interface registers, so that is may be implemented by the T-Con.

The device may be configured to collect the T-Con P2P clock phase-locked loop (PLL) capacity. This may only be supported by T-Con PLLs with a fractional PLL. The RF Interference Mitigation Manager may determine a minimum frequency and a maximum frequency at which the T-Con may operate (e.g. a minimum and maximum possible operational frequency for the T-Con, which will define the lower and upper limits of any potation TCON_P2P_CLK_Freq). The RF Interference Mitigation Manager may utilize a training pattern (a division factor) to calculate the effective P2P clock frequency.

Figure 5:
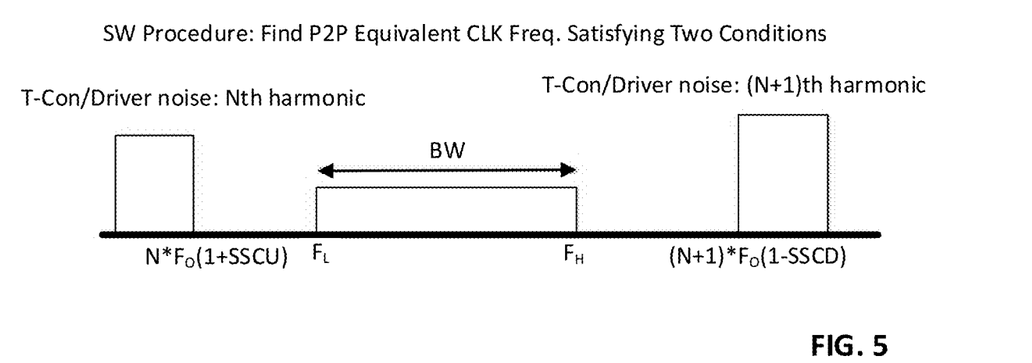
FIG. 5 depicts the RF Interference Mitigation Manager determining a current spread spectrum clocking (SSC) and/or a maximum and minimum SSC.

The RF Interference Mitigation Manager may determine the current spread spectrum clocking (SSC) and/or a maximum and minimum SSC, as depicted in FIG. 5. It can be seen that for the SSC-up (SSCU) and the SSC-down (SSCD):

$$\frac{(1 + SSCU)(N * F_O) + (1 - SSCD)(N + 1) * F_O}{2} = \quad (1)$$

$$\frac{F_H + F_L}{2}, N = 1, 2, 3, 4$$

$$(1 + SSCU)NF_O < F_L, N = 1, 2, 3, 4 \quad (2)$$

$$(1 - SSCD)(N + 1)F_O > F_H, N = 1, 2, 3, 4 \quad (3)$$

Combining (1), (2), and (3):

$$\frac{F_H}{(1 - SSCD)(N + 1)} < F_O = \frac{F_H + F_L}{N(2 + SSCU - SSCD) + (1 - SSCD)} <$$

$$\frac{F_L}{(1 + SSCU)N}, N = 1, 2, 3, 4$$

For example, the SSC-up (SSCU) may be X2.Y2%; SSCU X2.Y2/100. The SSC-down (SSCD) may be X1.Y1%; SSCD=X1.Y1/100, as seen in FIG. 5.

Figure 6:
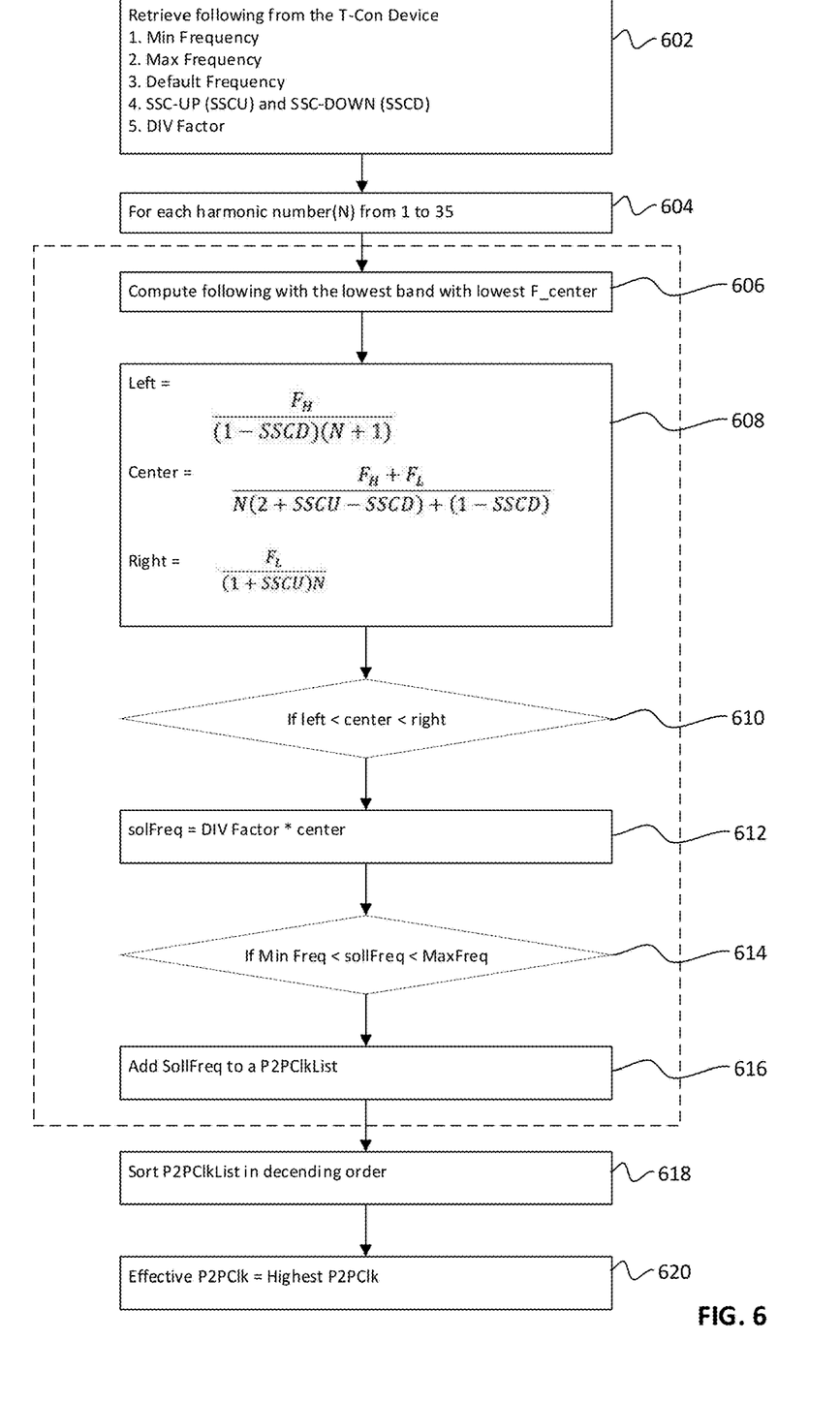
FIG. 6 depicts a flow chart of an algorithm to compute an effective/target P2P clock frequency to mitigate noise.

The overall software algorithm to compute an effective/target P2P clock frequency to mitigate the noise can be illustrated using the below flow chart depicted in FIG. 6. As depicted in this figure, the following information may be retrieved from the T-Con: a minimum frequency, a maximum frequency, a default frequency, SSCU and SSCD, and a division factor (DIV factor) 602. For each harmonic number (N) from, for example, 1 to 35 (604), the left, center, and right factors may be determined, following with the lowest band with the lowest F_center 606. If the left<center<right 610, then the solFreq (the frequency to be selected) is calculated as the DIV factor*the center 612. If the minimum frequency<the sollFreq<MaxFreq (the maximum frequency) 614 then the SollFreq is added to the P2PClkList 616 (e.g. the SollFreq is added to a list of candidate clock frequencies). The P2PClkList may be sorted, such as in descending order 618, and the effectiveP2PClk frequency is determined as the highest P2PClk frequency on the P2PClkList 620.

The following depicts an experiment as proof of concept.

For all the experiments below, following parameters were used for illustration:
SSCD=0.1
SSCU=0.1
Multiplication factor/Training pattern=14
N is the harmonics.
Min TCON P2P CLK Freq=500 MHZ
Max TCON P2P CLK Freq=1 GHz Only bands 12 and n71 are depicted, for simplicity. For other bands, the effective P2P clock can be computed in a similar fashion. The T-Con minimum and maximum clock were used above was only for illustration. The actual minimum and maximum P2P clock frequency can depend on the vendor/model.

Figure 7:
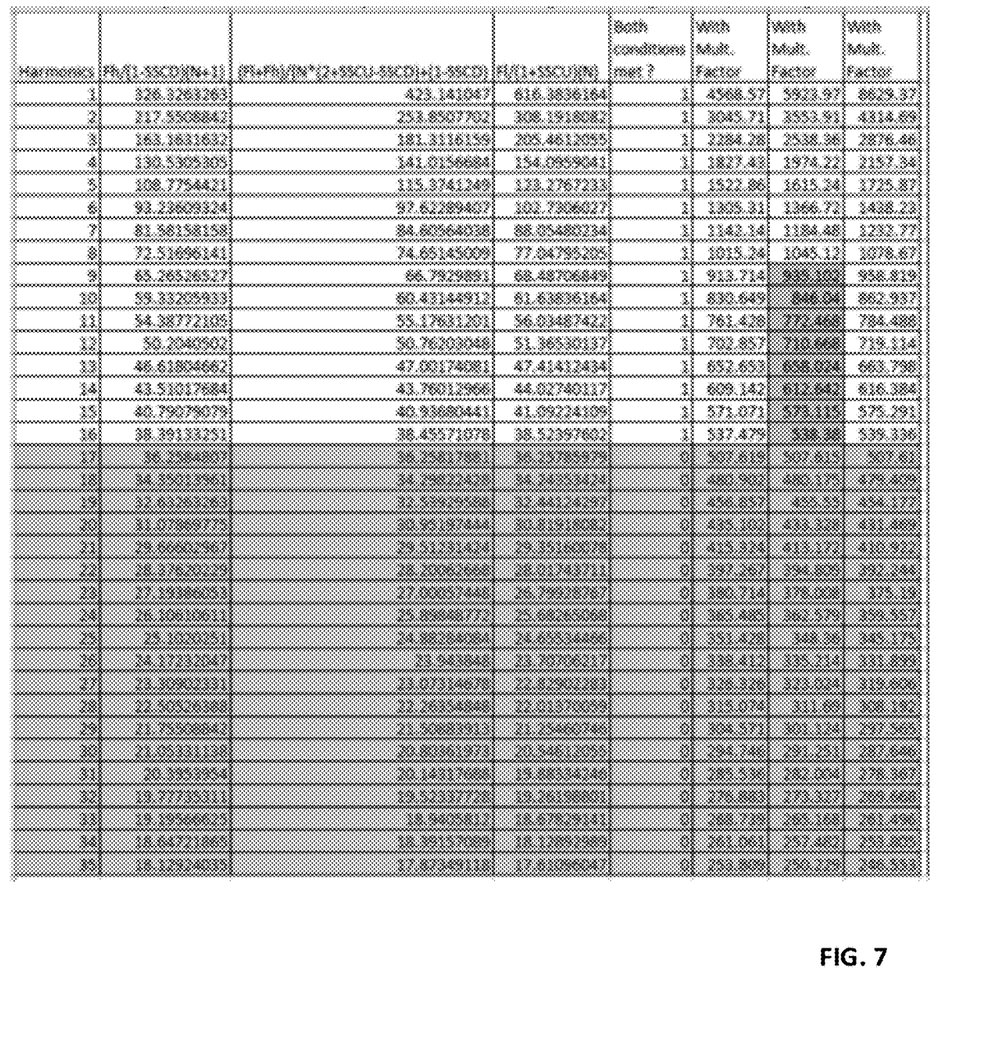
FIG. 7 depicts an effective s clock Frequency computation for Band-12.

For Band-12:
Band start, Fl=729 MHz
Band stop, Fh=746 MHZ
Frequencies shown in green are the possible solution frequencies. Out of this green set, the maximum frequency selected was 983.38 MHz. See FIG. 7 for the effective P2P clock Frequency computation for Band-12.
8.2 Band-n71
As per 3GPP, the Band start, Fl=617 MHz, and the Band stop, Fh=652 MHz.

Frequencies shown in green are the possible solution frequencies. Out of this green set, the maximum frequency, which was 983.38 MHz, was selected.

It is expressly noted that, for the greyed-out cell, neither inequality is satisfied.

Further aspects of the disclosure will be described by way of Example:

In Example 1, a device including a processor, configured to determine a band used for wireless communication by a baseband modem; select an operational frequency for a display controller based on the determined band; and control the display controller to operate at the selected operational frequency.

In Example 2, the device of Example 1, wherein the processor selecting the operational frequency for the display controller based on the band includes the processor selecting the operational frequency as a frequency for which the frequency and all harmonics of the frequency are outside the band.

In Example 3, the device of Example 2, wherein a plurality of candidate operational frequencies and their respective harmonics are outside of the band; and wherein the processor selecting the operational frequency includes the processor selecting a highest candidate operational frequency of the candidate operational frequencies as the operational frequency.

In Example 4, the device of any one of Examples 1 to 3, further including a communication interface, configured to receive a signal representing one or more frequencies used for the wireless communication by the baseband modem; wherein the processor determining the band used for wireless communication includes the processor determining the band from the signal.

In Example 5, the device of Example 4, wherein the interface is an Embedded Display Port (eDP) interface according to a Video Electronics Standards Association DisplayPort standard.

In Example 6, the device of any one of Examples 1 to 5, wherein the processor is further configured to determine whether the band has changed from a first band to a second band, different from the first band; and wherein the processor is configured to select the operational frequency for the display controller based on the determined band, only if the band has changed from the first band to the second band; and wherein the processor is configured to not select the operational frequency for the display controller if the band has not changed from the first band to the second band.

In Example 7, the device of any one of Examples 1 to 6, wherein the processor is further configured to determine a maximum operational frequency of the display controller and a minimum operational frequency of the display controller; and wherein the processor selecting the operational frequency includes selecting the operational frequency from one or more candidate operational frequencies between the maximum operational frequency and the minimum operational frequency.

In Example 8, the device of any one of Examples 1 to 7, wherein the processor controlling the display controller to operate at the selected operational frequency includes the processor writing the selected operational frequency in a memory.

In Example 9, the device of any one of Examples 1 to 7, wherein the processor controlling the display controller to operate at the selected operational frequency includes the processor sending a signal representing an instruction for the display controller to operate at the selected operational frequency.

In Example 10, the device of any one of Examples 1 to 9, wherein the processor determining the band used for wireless communication by a baseband modem includes the processor, for each of a plurality of candidate bands, determining a difference between a median frequency of the candidate band and a center frequency of a wireless transmission, and selecting the band used for the wireless communication as the band of the plurality of candidate bands having a smallest difference between the median frequency of the candidate band and the center frequency of the wireless transmission.

In Example 11, the device of any one of Examples 1 to 10, wherein the selected operational frequency is a frequency for which a first harmonic of the frequency and a second harmonic of the frequency are equidistant from a center frequency of the band.

In Example 12, a method of controlling a display frequency, including: determining a band used for wireless communication by a baseband modem; selecting an operational frequency for a display controller based on the determined band; and controlling the display controller to operate at the selected operational frequency.

In Example 13, the method of Example 12, wherein selecting the operational frequency for the display controller based on the band includes selecting the operational frequency as a frequency for which the frequency and all harmonics of the frequency are outside the band.

In Example 14, the method of Example 13, wherein a plurality of candidate operational frequencies and their respective harmonics are outside of the band; and wherein selecting the operational frequency includes selecting a highest candidate operational frequency of the candidate operational frequencies as the operational frequency.

In Example 15, the method of any one of Examples 12 to 14, further including a communication interface, configured to receive a signal representing one or more frequencies used for the wireless communication by the baseband modem; wherein determining the band used for wireless communication includes the processor determining the band from the signal.

In Example 16, the method of Example 15, wherein the interface is an Embedded Display Port (eDP) interface according to a Video Electronics Standards Association DisplayPort standard.

In Example 17, the method of any one of Examples 12 to 16, further including determining whether the band has changed from a first band to a second band, different from the first band; and further including selecting the operational frequency for the display controller based on the determined band, only if the band has changed from the first band to the second band; and not selecting the operational frequency for the display controller if the band has not changed from the first band to the second band.

In Example 18, the method of any one of Examples 12 to 17, further including determining a maximum operational frequency of the display controller and a minimum operational frequency of the display controller; and wherein selecting the operational frequency includes selecting the operational frequency from one or more candidate operational frequencies between the maximum operational frequency and the minimum operational frequency.

In Example 19, the method of any one of Examples 12 to 18, wherein controlling the display controller to operate at the selected operational frequency includes writing the selected operational frequency in a memory.

In Example 20, the method of any one of Examples 12 to 18, wherein controlling the display controller to operate at the selected operational frequency includes sending a signal representing an instruction for the display controller to operate at the selected operational frequency.

In Example 21, the method of any one of Examples 12 to 20, wherein determining the band used for wireless communication by a baseband modem includes, for each of a plurality of candidate bands, determining a difference between a median frequency of the candidate band and a center frequency of a wireless transmission, and selecting the band used for the wireless communication as the band of the plurality of candidate bands having a smallest difference between the median frequency of the candidate band and the center frequency of the wireless transmission.

In Example 22, the method of any one of Examples 12 to 21, wherein the selected operational frequency is a frequency for which a first harmonic of the frequency and a second harmonic of the frequency are equidistant from a center frequency of the band.

In Example 23, a non-transitory computer readable medium, including instructions which, when executed by one or more processors, cause the one or more processors to perform the method of any one of Examples 12 through 22.

In Example 24, a means for reducing interference by controlling a clock signal for a display, including processing means for: determining a band used for wireless communication by a baseband modem; selecting an operational frequency for a display controller based on the determined band; and controlling the display controller to operate at the selected operational frequency.

In Example 25, the means of Example 24, wherein the processing means being for selecting the operational frequency for the display controller based on the band includes the processing means being for selecting the operational frequency as a frequency for which the frequency and all harmonics of the frequency are outside the band.

In Example 26, the means of Example 25, wherein a plurality of candidate operational frequencies and their respective harmonics are outside of the band; and wherein the processing means being for selecting the operational frequency includes the processing means being for selecting a highest candidate operational frequency of the candidate operational frequencies as the operational frequency.

In Example 27, the means of any one of Examples 24 to 26, further including a communication interface means for receiving a signal representing one or more frequencies used for the wireless communication by the baseband modem; wherein the processing means being for determining the band used for wireless communication includes the processing means being for determining the band from the signal.

In Example 28, the means of Example 27, wherein the communication interface means is an Embedded Display Port (eDP) interface according to a Video Electronics Standards Association DisplayPort standard.

In Example 29, the means of any one of Examples 24 to 28, wherein the processing means is further for determining whether the band has changed from a first band to a second band, different from the first band, and for selecting the operational frequency for the display controller based on the determined band, only if the band has changed from the first band to the second band, for not selecting the operational frequency for the display controller if the band has not changed from the first band to the second band.

In Example 30, the means of any one of Examples 24 to 29, wherein the processing means is further for determining a maximum operational frequency of the display controller and a minimum operational frequency of the display controller; and wherein the processing means being for selecting the operational frequency includes being for selecting the operational frequency from one or more candidate operational frequencies between the maximum operational frequency and the minimum operational frequency.

In Example 31, the means of any one of Examples 24 to 30, wherein the processing means being for controlling the display controller to operate at the selected operational frequency includes the processing means being for writing the selected operational frequency in a memory.

In Example 32, the means of any one of Examples 24 to 30, wherein the processing means being for controlling the display controller to operate at the selected operational frequency includes the processing means being for sending a signal representing an instruction for the display controller to operate at the selected operational frequency.

In Example 33, the means of any one of Examples 24 to 32, wherein the processing means being for determining the band used for wireless communication by a baseband modem includes the processing means, for each of a plurality of candidate bands, being for determining a difference between a median frequency of the candidate band and a center frequency of a wireless transmission, and being for selecting the band used for the wireless communication as the band of the plurality of candidate bands having a smallest difference between the median frequency of the candidate band and the center frequency of the wireless transmission.

In Example 34, the means of any one of Examples 24 to 33, wherein the selected operational frequency is a frequency for which a first harmonic of the frequency and a second harmonic of the frequency are equidistant from a center frequency of the band.

While the above descriptions and connected figures may depict components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:

1. A device comprising a processor, configured to:
   determine a band used for wireless communication by a baseband modem, wherein the band has a band start, a band stop, and at least one band harmonic;
   receive, from a display controller, a minimum clock frequency, a maximum clock frequency, a spread spectrum clock up, and a spread spectrum clock down;
   for the at least one band harmonic, compute a left factor, a center factor, and a right factor based on the band start, the band stop, the spread spectrum clock up, and the spread spectrum clock down;
   based on a determination that the center factor is greater than the left factor and less than the right factor, and that the center factor multiplied by a multiplication factor is greater than the minimum clock frequency and less than the maximum clock frequency, select an operational frequency for the display controller; and
   control the display controller to operate at the selected operational frequency.

2. The device of claim 1, further comprising a communication interface, configured to receive a signal representing one or more frequencies used for the wireless communication by the baseband modem; wherein the processor determining the band used for wireless communication comprises the processor determining the band from the signal.

3. The device of claim 2, wherein the communication interface is an Embedded Display Port (eDP) interface according to a Video Electronics Standards Association DisplayPort standard.

4. The device of claim 1, wherein the processor is further configured to determine whether the band has changed from a first band to a second band, different from the first band; and wherein the processor is configured to select the operational frequency for the display controller based on the determined band, only if the band has changed from the first band to the second band; and wherein the processor is configured to not select the operational frequency for the display controller if the band has not changed from the first band to the second band.

5. The device of claim 1, wherein the processor is further configured to determine a maximum operational frequency of the display controller and a minimum operational frequency of the display controller; and wherein the processor selecting the operational frequency comprises selecting the operational frequency from one or more candidate operational frequencies between the maximum operational frequency and the minimum operational frequency.

6. The device of claim 1, wherein the processor controlling the display controller to operate at the selected operational frequency comprises the processor sending a signal representing an instruction for the display controller to operate at the selected operational frequency.

7. The device of claim 1, wherein the processor determining the band used for wireless communication by a baseband modem comprises the processor, for each of a plurality of candidate bands, determining a difference between a median frequency of a candidate band and a center frequency of a wireless transmission, and selecting the band used for the wireless communication as the band of the plurality of candidate bands having a smallest difference between the median frequency of the candidate band and the center frequency of the wireless transmission.

8. The device of claim 1, wherein the selected operational frequency is a frequency for which a first harmonic of the frequency and a second harmonic of the frequency are equidistant from a center frequency of the band.

9. A non-transitory computer readable medium, comprising instructions which, if executed by a processor, cause the processor to:
   determine a band used for wireless communication by a baseband modem, wherein the band has a band start, a band stop, and at least one band harmonic;

receive, from a display controller, a minimum clock frequency, a maximum clock frequency, a spread spectrum clock up, and a spread spectrum clock down;

for the at least one band harmonic, compute a left factor, a center factor, and a right factor based on the band start, the band stop, the spread spectrum clock up, and the spread spectrum clock down;

based on a determination that the center factor is greater than the left factor and less than the right factor, and that the center factor multiplied by a multiplication factor is greater than the minimum clock frequency and less than the maximum clock frequency, select an operational frequency for the display controller based on the determined band; and control the display controller to operate at the selected operational frequency;

wherein the processor selecting the operational frequency for the display controller based on the band comprises selecting the operational frequency as a frequency for which the frequency and all harmonics of the frequency are outside the band;

wherein a plurality of candidate operational frequencies and their respective harmonics are outside of the band; and wherein the processor selecting the operational frequency comprises selecting a highest candidate operational frequency of the candidate operational frequencies as the operational frequency.

10. The non-transitory computer readable medium of claim 9, wherein the processor determining the band used for wireless communication comprises the processor determining the band from a signal received at an Embedded Display Port (eDP) interface according to a Video Electronics Standards Association DisplayPort standard.

11. The non-transitory computer readable medium of claim 9, wherein the instructions are further configured to cause the processor to determine whether the band has changed from a first band to a second band, different from the first band; and to select the operational frequency for the display controller based on the determined band, only if the band has changed from the first band to the second band; and not to select the operational frequency for the display controller if the band has not changed from the first band to the second band.

12. The non-transitory computer readable medium of claim 9, wherein the instructions are further configured to cause the processor to determine a maximum operational frequency of the display controller and a minimum operational frequency of the display controller; and wherein the processor selecting the operational frequency comprises the processor selecting the operational frequency from one or more candidate operational frequencies between the maximum operational frequency and the minimum operational frequency.

13. The non-transitory computer readable medium of claim 9, wherein the processor controlling the display controller to operate at the selected operational frequency comprises the processor sending a signal representing an instruction for the display controller to operate at the selected operational frequency.

14. The non-transitory computer readable medium of claim 9, wherein determining the band used for wireless communication by a baseband modem comprises, for each of a plurality of candidate bands, determining a difference between a median frequency of a candidate band and a center frequency of a wireless transmission, and selecting the band used for the wireless communication as the band of the plurality of candidate bands having a smallest difference between the median frequency of the candidate band and the center frequency of the wireless transmission.

15. The non-transitory computer readable medium of claim 9, wherein the selected operational frequency is a frequency for which a first harmonic of the frequency and a second harmonic of the frequency are equidistant from a center frequency of the band.

16. A device comprising:
a radio, operable at a wireless channel, wherein the wireless channel has a band start, a band stop, and at least one band harmonic;
a display, controlled by a display controller having a minimum clock frequency, a maximum clock frequency, a spread spectrum clock up, and a spread spectrum clock down;
a processor configured to:
compute, for the at least one band harmonic, a left factor, a center factor, and a right factor based on the band start, the band stop, the spread spectrum clock up, and the spread spectrum clock down;
select an operational frequency for the display controller, based on a determination that the center factor is greater than the left factor and less than the right factor, and that the center factor multiplied by a multiplication factor is greater than the minimum clock frequency and less than the maximum clock frequency; and
control the display controller to operate at the selected operational frequency.

17. The device of claim 16, wherein the processor selecting the operational frequency for the display controller further comprises the processor selecting a plurality of candidate operational frequencies and wherein the processor selecting the operational frequency further comprises the processor selecting a highest candidate operational frequency of the candidate operational frequencies as the operational frequency.

* * * * *